(12) United States Patent
Shao et al.

(10) Patent No.: US 8,885,489 B2
(45) Date of Patent: Nov. 11, 2014

(54) METHOD AND SYSTEM FOR AUDIO/VIDEO CONNECTION MAINTENANCE

(75) Inventors: Huai-Rong Shao, San Jose, CA (US); Ju-Lan Hsu, San Jose, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 13/410,238

(22) Filed: Mar. 1, 2012

(65) Prior Publication Data

US 2012/0224496 A1    Sep. 6, 2012

Related U.S. Application Data

(60) Provisional application No. 61/448,508, filed on Mar. 2, 2011.

(51) Int. Cl.
```
H04L 12/26       (2006.01)
H04N 7/15        (2006.01)
H04L 29/06       (2006.01)
H04N 21/4363     (2011.01)
H04N 21/442      (2011.01)
H04N 21/6543     (2011.01)
H04N 21/4788     (2011.01)
```
(52) U.S. Cl.
CPC .............. *H04N 21/6543* (2013.01); *H04N 7/15* (2013.01); *H04L 65/604* (2013.01); *H04N 21/43637* (2013.01); *H04N 21/43635* (2013.01); *H04L 43/0811* (2013.01); *H04N 21/44227* (2013.01); *Y04S 40/168* (2013.01); *H04N 21/4788* (2013.01); *H04L 65/4015* (2013.01)

USPC ............................................ 370/248; 370/389

(58) Field of Classification Search
CPC .......... H04W 76/045; H04W 72/1278; H04W 24/00
USPC .......................................... 370/248, 389, 392
See application file for complete search history.

(56) References Cited

U.S. PATENT DOCUMENTS

| | | | | |
|---|---|---|---|---|
| 8,325,644 | B2 * | 12/2012 | Sampath et al. | 370/312 |
| 8,457,026 | B1 * | 6/2013 | Ho et al. | 370/310 |
| 2007/0230333 | A1 * | 10/2007 | Kakiuchi | 370/217 |
| 2009/0196207 | A1 * | 8/2009 | Watanabe | 370/310 |
| 2012/0057517 | A1 * | 3/2012 | Kambhatla et al. | 370/315 |

* cited by examiner

*Primary Examiner* — Dang Ton
*Assistant Examiner* — Mewale Ambaye
(74) *Attorney, Agent, or Firm* — Kenneth L. Sherman, Esq.; Michael Zarrabian, Esq.; Sherman & Zarrabian LLP (57) ABSTRACT

Embodiments of the invention provide connection maintenance for communication of audio/video (AV) information. One implementation comprises transmitting audio/video (AV) information as multiple spatial streams from a wireless transmitter to at least one wireless receiver over a wireless link, wherein each spatial stream is targeted to one of multiple AV devices connected to the wireless receiver. Receiving the AV information at the wireless receiver and providing the AV information from each spatial stream to a target AV device connected to the wireless receiver via a communication link, wherein each communication link corresponds to a spatial stream. Detecting connection status information for the wireless link and the communication links. Transmitting the connection status information from the wireless receiver to the wireless transmitter.

40 Claims, 9 Drawing Sheets

|        | TransactionID |
|--------|---------------|
| Octets: | 1            |

|        | TransactionID |
|--------|---------------|
| Octets: | 1            |

|         | TransactionID | StreamNum | StreamID-1 | ... | StreamID-N |
|---------|---------------|-----------|------------|-----|------------|
| Octets: | 1             | 1         | 1          | ... | 1          |

|         | TransactionID | StreamNum | StreamID-1 | ... | StreamID-N |
|---------|---------------|-----------|------------|-----|------------|
| Octets: | 1             | 1         | 1          | ... | 1          |

| | TransactionID | ConnectorNum | ConnectorID-1 | ... | ConnectorID-N |
|---|---|---|---|---|---|
| Octets: | 1 | 1 | 1 | ... | 1 |

METHOD AND SYSTEM FOR AUDIO/VIDEO CONNECTION MAINTENANCE

CROSS-REFERENCE TO RELATED APPLICATIONS

This application claims the benefit of U.S. provisional patent application Ser. No. 61/448,508, filed Mar. 2, 2011, incorporated herein by reference.

FILED OF THE INVENTION

The present invention relates to audio/video transmission, and in particular, to audio/video transmission connection maintenance.

BACKGROUND OF THE INVENTION

In wireless systems for audio/video (AV) communication, typically one audio/video (AV) source device is connected to a wireless transceiver and one AV sink device is connected to another wireless transceiver. The AV source device and the AV sink device communicate with each other using the wireless transceivers over a wireless communication medium.

BRIEF SUMMARY OF THE INVENTION

Embodiments of the invention provide a method and system for audio/video (AV or A/V) connection maintenance in a network. Embodiments of the invention provide connection maintenance for communication of audio/video (AV) information. One implementation comprises transmitting audio/video (AV) information as multiple spatial streams from a wireless transmitter to at least one wireless receiver over a wireless link, wherein each spatial stream is targeted to one of multiple AV devices connected to the wireless receiver. Receiving the AV information at the wireless receiver and providing the AV information from each spatial stream to a target AV device connected to the wireless receiver via a communication link, wherein each communication link corresponds to a spatial stream. Detecting connection status information for the wireless link and the communication links. Transmitting the connection status information from the wireless receiver to the wireless transmitter.

These and other features, aspects and advantages of the present invention will become understood with reference to the following description, appended claims and accompanying figures.

DETAILED DESCRIPTION OF THE INVENTION

Embodiments of the invention provide a method and system for audio/video (AV or A/V) connection maintenance in a network. Embodiments of the invention provide connection maintenance for communication of audio/video (AV) information. One implementation comprises transmitting audio/video (AV) information as multiple spatial streams from a wireless transmitter to at least one wireless receiver over a wireless link, wherein each spatial stream is targeted to one of multiple AV devices connected to the wireless receiver. Receiving the AV information at the wireless receiver and providing the AV information from each spatial stream to a target AV device connected to the wireless receiver via a communication link, wherein each communication link corresponds to a spatial stream. Detecting connection status information for the wireless link and the communication links. Transmitting the connection status information from the wireless receiver to the wireless transmitter. In one embodiment, the transmitter uses the connection status information to modify transmissions such as stopping transmission of those streams with connection status information indicating communication link disconnection and/or inactive AV sink.

In the description of embodiments of the present invention herein, an AV source (or source) comprises an AV source device connected to a wireless transceiver. Further, an AV sink (or sink) comprises multiple AV sink devices connected to a wireless transceiver. Though embodiments of the invention are described in conjunction with protocol architecture of millimeter-wave (mmW) wireless systems, such as a Wireless Gigabit Alliance (WGA) industry standard layer model, and IEEE 802.11ad, the present invention is not limited to such applications and is useful with other wireless communication systems and wireless local area networks such as IEEE 802.11ac.

Figure 1:
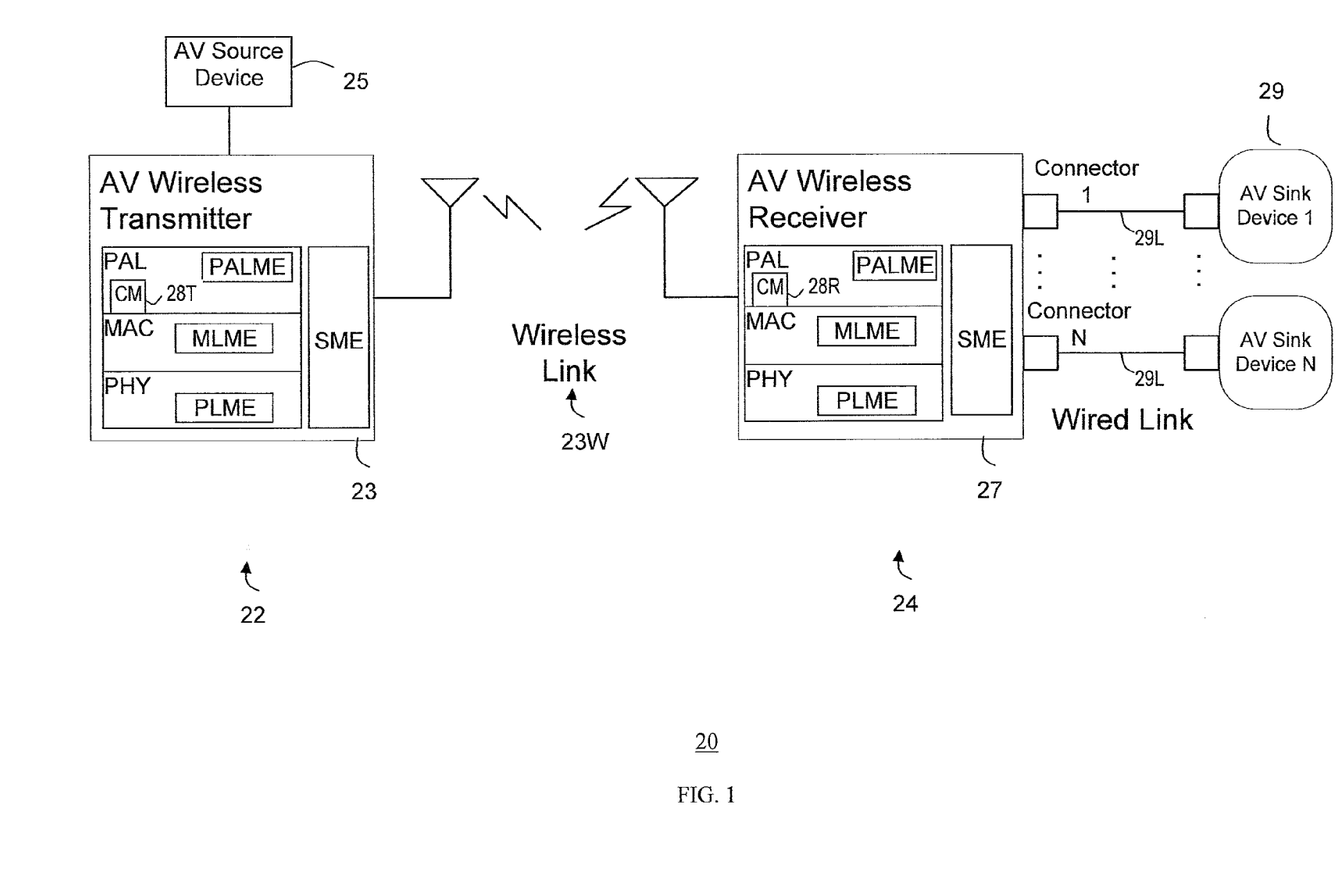
FIG. 1 shows architecture of a wireless communication system implementing AV connection maintenance, according to an embodiment of the invention.

FIG. 1 illustrates an example system 20 implementing an embodiment of AV connection maintenance according to the invention. The system 20 includes an AV source 22 an AV sink 24. The source 22 includes a mmW wireless transceiver module 23 and an AV source device 25 (e.g., DVD player providing uncompressed AV data). The AV sink 24 includes a mmW wireless transceiver module 27 and multiple AV sink devices 29 (e.g., TV, display monitor). In this example, the wireless transceiver module 23 functions as a transmitter, and the wireless transceiver module 27 functions as a receiver, communicating via wireless channels (Wireless Link) on radio frequencies using directional transmission such as beamforming via multiple antennas.

In one embodiment, the transmitter wireless station 23 and the receiver wireless station 27 each include a physical (PHY) layer, Media Access Control (MAC) layer, Protocol Adaptation Layer (PAL) layer, PHY layer management entity (PLME), MAC layer management entity (MLME), PAL management entity (PALME) and a station management entity (SME). In one example, the MAC layer receives a data packet including payload data, and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer to attach a PHY header (i.e., a PHY preamble) thereto to construct a PHY Protocol Data Unit (PPDU). The PHY header includes parameters for determining a transmission scheme including a coding/modulation scheme. The transmitter and receiver may further utilize directional transmission such as using beamforming and antenna arrays.

Figure 1A:
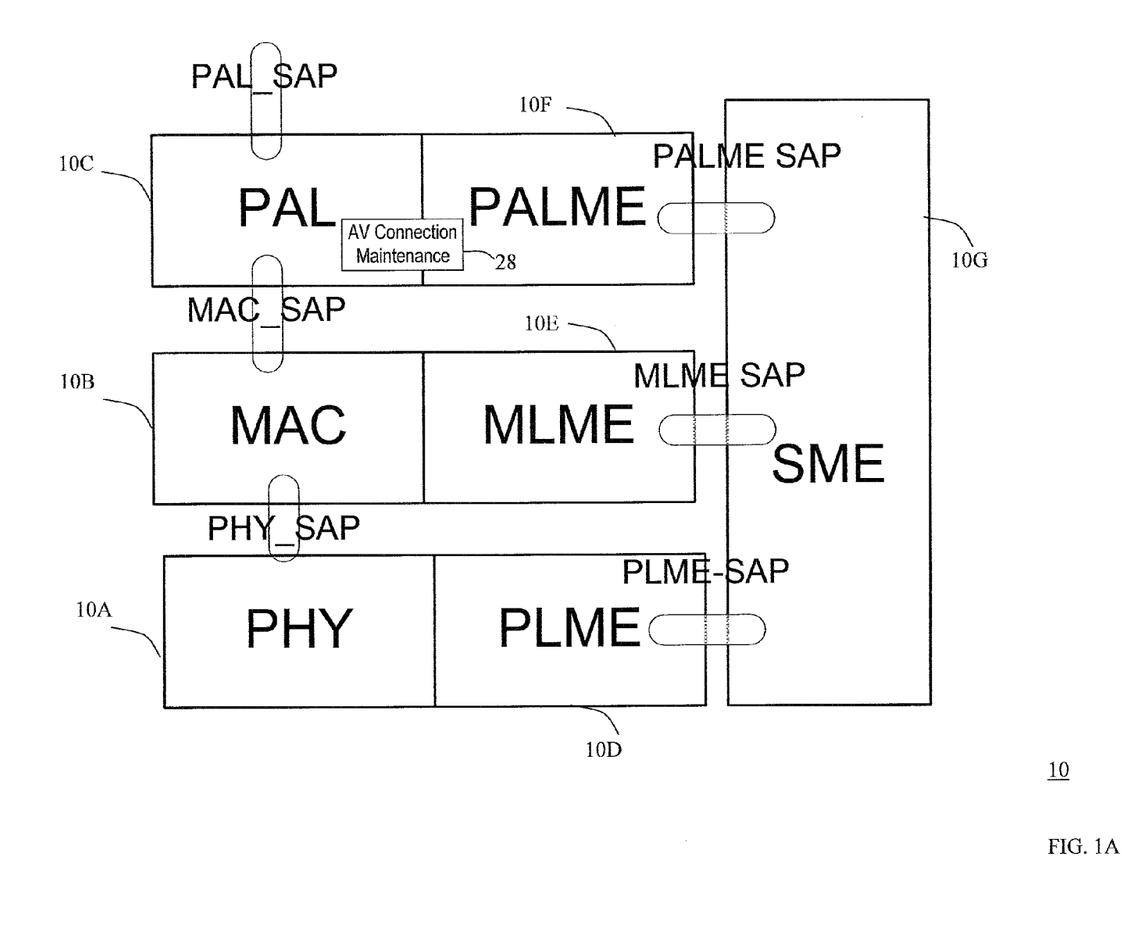
FIG. 1A shows architecture of a wireless transceiver module implementing AV connection maintenance, according to an embodiment of the invention.

FIG. 1A illustrates architecture of an example mmW wireless transceiver station 10 including a layering model such as a Wireless Gigabit Alliance (WGA) layering model and IEEE 802.11 standards. The transceiver station 10 is an example implementation for the transmitter 23 and the receiver 27 in FIG. 1 The layering model includes said seven functional entities/layers: physical (PHY) layer 10A, media access control (MAC) layer 10B, a protocol adaptation layer (PAL) 10C, a PHY management entity (PLME) 10D, a MAC management entity (MLME) 10E, a PAL management entity (PALME) 10F and a station management entity (SME) 10G.

The system 20 includes multiple AV sink devices 29, wherein the transmitter 23 transmits AV information to the receiver 27 from an AV source device 25 such as a video camera. The receiver 27 in turn provides the AV information to the AV sink devices 29. The communication system 20 includes a connection monitor comprising an AV connection maintenance system 28 (FIG. 1A) implementing an AV connection maintenance process according to an embodiment of the invention. The AV connection maintenance system 28 provides multiple AV connection maintenance for multiple AV sink devices 29 connected to the receiver 27 through communication links such as wired interfaces, wireless interfaces, and combinations thereof. As shown in FIG. 1, in one embodiment of the invention, the AV connection maintenance system 28 comprises AV connection maintenance modules (CM) 28T and 28R implemented in the PAL layers of the transmitter 23 and the receiver 27, respectively.

In one example, a television (TV) AV sink device 29 (e.g., AV Sink Device N) is connected to the receiver 27 through a HDMI or DisplayPort interface, and an audio speaker AV sink device 29 (e.g., AV Sink Device N) is connected to the receiver 27 using a S/PDIF interface. In another example, multiple AV sink devices 29 can be connected to the receiver 27 through multiple HDMI or DisplayPort interfaces.

Embodiments the present invention provide AV Connection Maintenance Request control packets (i.e., request control packets) and AV Connection Maintenance Response control packet (i.e., response control packets), for AV connection maintenance. According to an embodiment of the invention, AV connection maintenance only targets at maintaining the wireless link 23W between the transmitter 23 and the receiver 23 (wired interfaces are excluded). As such, no stream information needs to be included in the request control packet since all streams included in the request control packet have the same wireless connection status.

Figure 2A:
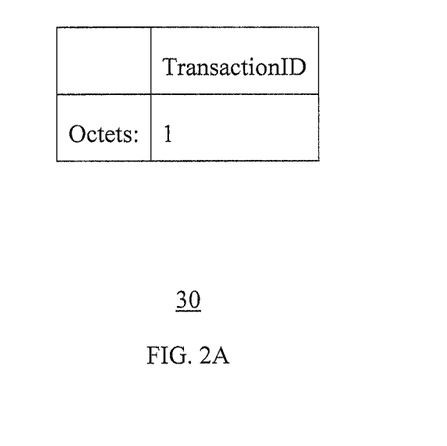
FIGS. 2A-2B show an AV connection maintenance request control packet and AV connection maintenance response control packet, respectively, according to an embodiment of the invention.
Figure 2B:
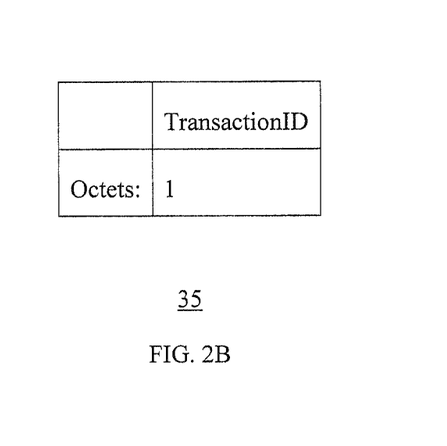

FIGS. 2A-2B show an AV connection maintenance request control packet 30 an AV connection maintenance response control packet 35, respectively, for the case wherein AV connection maintenance only targets at maintaining the wireless link 23W between the transmitter 23 and the receiver 23, according to an embodiment of the invention. The value in the TransactionID field of the response control packet 35 is the same as the value of the TransactionID in the request control packet 30 the response control packet 35.

According to another embodiment of the invention, AV connection maintenance encompasses the communication link between the transmitter 23 and the receiver 27, and the communication links between the receiver 27 and the AV sink devices 29 via multiple connectors (e.g., Connector 1, . . . , Connector N), providing end-to-end connection maintenance.

In one embodiment, the AV connection maintenance process provides end-to-end AV connection maintenance that includes both the wireless communication link 23W between the transmitter 23 and the receiver 27, and the communication links 29L between the receiver 27 and the AV sink devices 29.

In one embodiment the present invention provides an AV Connection Maintenance Request control packet 40 (i.e., request control packet 40 shown in FIG. 3A) and an AV Connection Maintenance Response control packet, for AV connection maintenance 45 (i.e., response control packet 45 shown in FIG. 3B), for end-to-end AV connection maintenance. The TransactionID field contains a value that identifies a specific transaction of A/V connection maintenance. In one example, a transaction is a type of end-to-end communication session which may include one or more connections or streams. The StreamNum field indicates the number of streams that are included in the AV Connection Maintenance Request control packet or AV Connection Maintenance Response control packet. The StreamID field indicates the Stream index of the AV connection between the AV source device 25 and an AV sink device 29 that is being maintained.

According to an embodiment of the invention, multiple spatial AV streams from the AV source 25 are wirelessly transmitted by the transmitter 23 to the receiver 27. Each AV stream is directed to a destination AV sink device 29 by the receiver 27, as specified in a request control packet from the transmitter 23. According to an embodiment of the invention, a response control packet from the receiver 27 to the transmitter 23 includes stream information which indicates connection status of each stream, as described herein.

In one embodiment of the invention, the AV connection maintenance system 28 provides connection status information to the transmitter 23 for each communication link between the source 25 and the sinks 29, employing a control packet exchange process using said request and response control packets.

In one embodiment, when transmitting AV streams from the transmitter 23 to the receiver 27, the AV connection maintenance system 28 detects whether a connection link 29L between an AV sink device 29 and the receiver 27 (and between the receiver 27 and the transmitter 23) remains functional.

In one example, one or more links 29L between the receiver 23 and the AV sink devices 29 may be disrupted, while other links 29L are still active. The AV connection maintenance system 28 provides connection status information to the transmitter 23 for each connected and each disrupted communication link.

In one example, the wireless link 23W between the transmitter 23 and the receiver 27 remains functional, while a first link 29 for a first AV sink device 29 (e.g., Receive stream 1 for AV Sink Device 1) is disconnected from Connector 1 of the receiver 27, but a second link 29 for a second AV sink device (e.g., Receive stream 2 for AV Sink Device 2) remains connected to Connector 2 of the receiver 27. The AV connection maintenance system 28 provides connection status information to the transmitter 23 for each communication link 23W, 29L in such a scenario.

In one embodiment of the invention, connection status information of each sink device 29 is detected by the CM 28R of the receiver 27 and included in one or more response control packets and transmitted to the CM 28T of the transmitter 23.

According to an embodiment of the invention, an AV connection maintenance request field or bit is provided in a normal packet to indicate the request from the transmitter 23 to the receiver 27 in order to request a response control packet from the receiver 27. In this way, there is no need to send a separate AV connection maintenance request control packet. In one embodiment of the invention, the CM 28T sets said AV connection maintenance request field or bit in a data packet from the transmitter 23 to the receiver 27 in order to request a response control packet from the receiver 27. The CM 28R places status information of communication links supporting each AV stream from the AV source 25 to an AV sink 29 into a response control packet, and sends each response control pack from the receiver 27 to the transmitter 23.

Figure 3A:
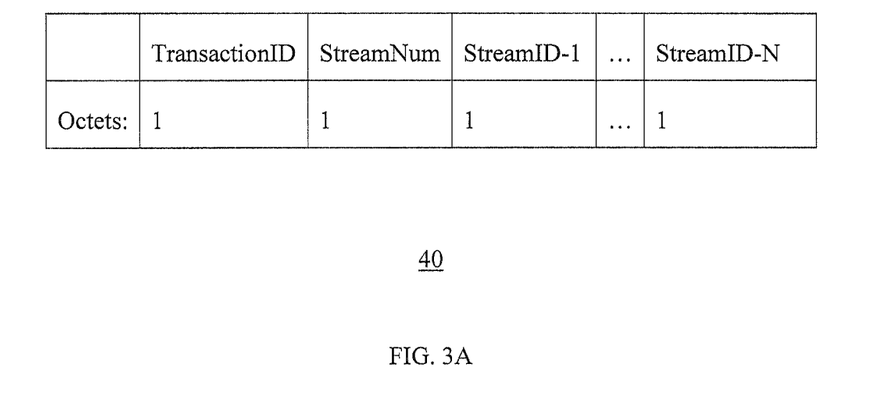
FIGS. 3A-3B show an AV connection maintenance request control packet and AV connection maintenance response control packet, respectively, according to another embodiment of the invention.
Figure 3B:
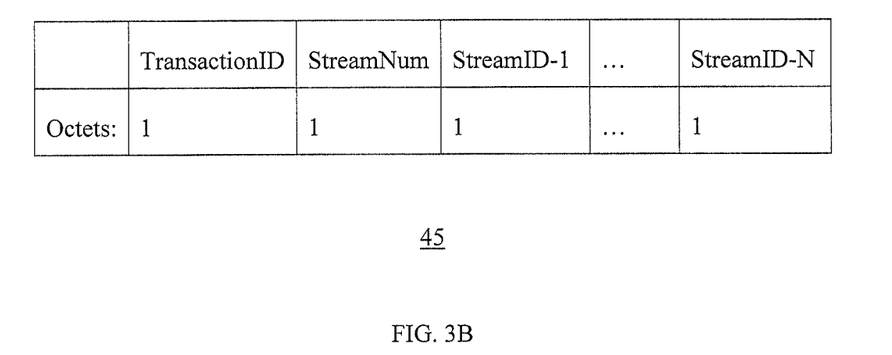

According to another embodiment of the invention, on-demand end-to-end connection maintenance is provided for multiple AV sink devices 29 connected to the wireless receiver 27 using wired interfaces, wherein multiple streams are transmitted from the transmitter 23 to the receiver 27. In this embodiment, AV connection maintenance targets at maintaining the wireless link 23W between the transmitter 23 and the receiver 27, and the wired links 29L. StreamIDs for functional (i.e., alive) links and sink devices 29 are included in the response control packet 45 illustrated in FIG. 3B. In this implementation, a request control packet 30 as in FIG. 2A or a request control packet 40 as in FIG. 3A, may be used. FIG. 3A also shows the Payload (i.e., StreamNum, StreamID-1, . . . , StreamID-N) of AV connection maintenance request control packet 40.

Figure 4:
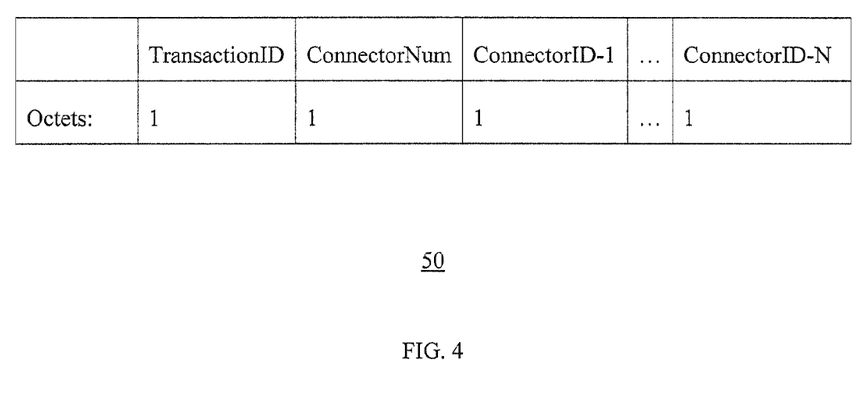
FIG. 4 shows an AV connection maintenance response control packet, according to another embodiment of the invention.

A variation of this implementation is to include receiver connector number information (i.e., ConnectorID) instead of StreamIDs into the AV connection maintenance response control packet and/or AV connection maintenance request control packet. The ConnectorIDs for the alive wired links 29L and sink devices 29 are included in an AV connection maintenance response control packet 50 as illustrated in FIG. 4. In this case, the corresponding AV connection maintenance request control packet can be the same format as shown in FIG. 4 or FIG. 2A.

In another embodiment of AV connection maintenance according to the present invention, a connection maintenance approach includes using a field (or one bit) added to the AV data packet (packet header or end of the packet) from the transmitter 23 to indicate a request to the receiver 27 to send an AV connection maintenance response control packet to the transmitter 23.

Figure 5:
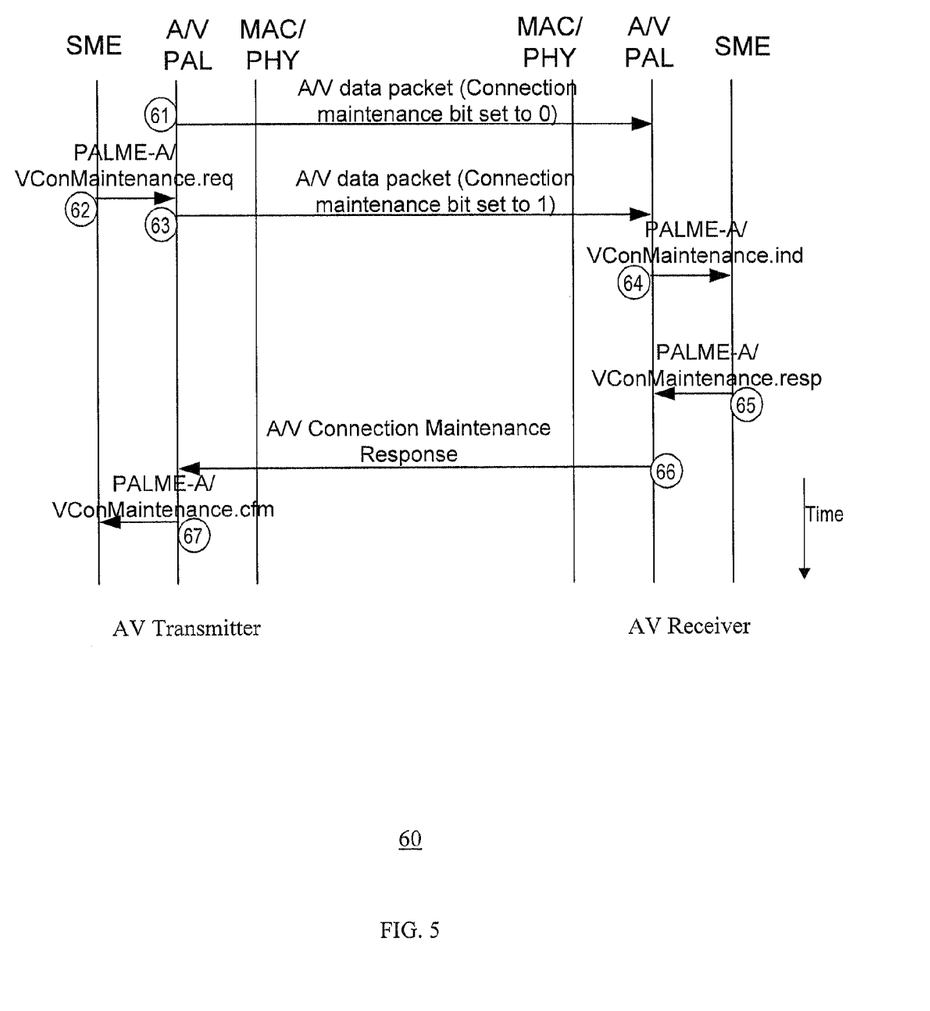
FIG. 5 shows an AV connection maintenance process, according to an embodiment of the invention.

FIG. 5 shows an AV connection maintenance process 60, according to an embodiment of the invention. The process 60 is described below in relation to the system 20 of FIG. 1. In process block 61, an AV transmitter (e.g., wireless transmitter 23 in FIG. 1) sends and AV data packet to a peer AV receiver (e.g., wireless receiver 27 in FIG. 1), including a connection maintenance bit set to 0, indicating connection maintenance is not requested. When a data packet A/V data packet with connection maintenance bit is set to 0, the receiver treats the data packet as a normal data packet and not as a request for connection maintenance response.

In process block 62, the transmitter SME sends a primitive PALME-A/VConMaintenance.request to the PAL layer. In process block 63, upon receiving the PALME-A/VConMainteance.request from SME, the transmitter AV PAL layer sends an AV data packet with connection maintenance bit set to 1, to the peer receiver PAL entity (layer). This indicates the transmitter request for AV connection maintenance information from the receiver (the data packet data payload is used by the receiver as usual). In process block 64, after the peer receiver PAL entity receives an A/V data packet with connection maintenance bit set to 1, it informs its SME of the AV connection maintenance request through primitive PALME-A/VConMaintenance.indication. In process block 65, after receiving primitive PALME-A/VConMaintenance.indication, the peer SME sends a primitive PALME-A/VConMaintenance.response to its PAL entity.

In process block 66, after receiving primitive PALME-A/VConMaintenance.response, the peer receiver PAL entity sends A/V Connection Maintenance Response control packet to the requesting transmitter PAL entity that initiated A/V connection setup. In process block 67, after receiving A/V Connection Maintenance Response control packet from the peer PAL entity, the requesting transmitter PAL entity reports the result of the A/V connection setup including connection status information to its SME using PALME-A/VConMaintenance.confirmation. The transmitter used the AV connection maintenance procedure to detect whether a connection between the source 25 and a sink 29 remains functional.

Figure 6:
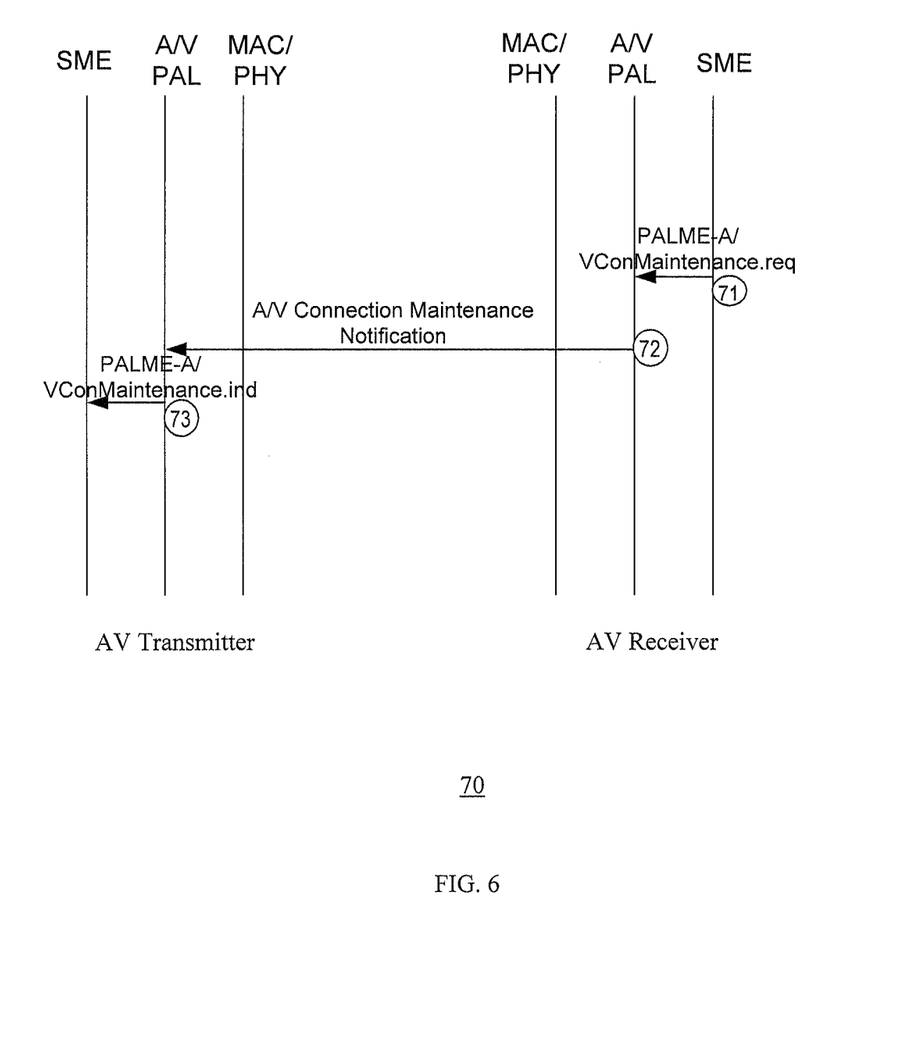
FIG. 6 shows an AV connection maintenance process, according to another embodiment of the invention.

FIG. 6 shows an AV connection maintenance process 70, according to another embodiment of the invention. The AV connection maintenance process 70 is a variation of the AV connection maintenance process 60, and dispenses with AV connection maintenance requests, wherein the receiver periodically sends AV connection maintenance notification control packets to the AV wireless transmitter. In process block 71, SME of the AV transmitter sends a PALME-A/VConMaintenance.req to the A/V PAL layer. In process block 72, the A/V PAL layer of the AV transmitter sends a AV Connection Maintenance Notification control packet to the AV transmitter. In process block 73, the A/V PAL layer sends a PALME-A/VConMaintenance.indication to the SME of the AV transmitter. The AV connection maintenance notification control packet may be of one of the formats shown in FIG. 2B, FIG. 3A or FIG. 4.

In an embodiment of the invention, control packets (e.g., messages) including status information of communication links supporting each AV stream from the AV source 25 to an AV sink 29, are transmitted by the CM 28R of the receiver 27 to the CM 28T of the transmitter 23 periodically without a request control packet or indication field/bit.

In another embodiment, the receiver transmits connection status information to the transmitter on a random basis within an upper bound since last transmission of such status information. In another embodiment, the receiver transmits connection status information to the transmitter as part of a data packet or other packet (rather than a response control packet), such as in case of two way AV communication between the transmitter and receiver (e.g., one the AV sink devices is a camera device which sends AV information to the receiver to transmit back to the transmitter in a video conferencing application).

Figure 7:
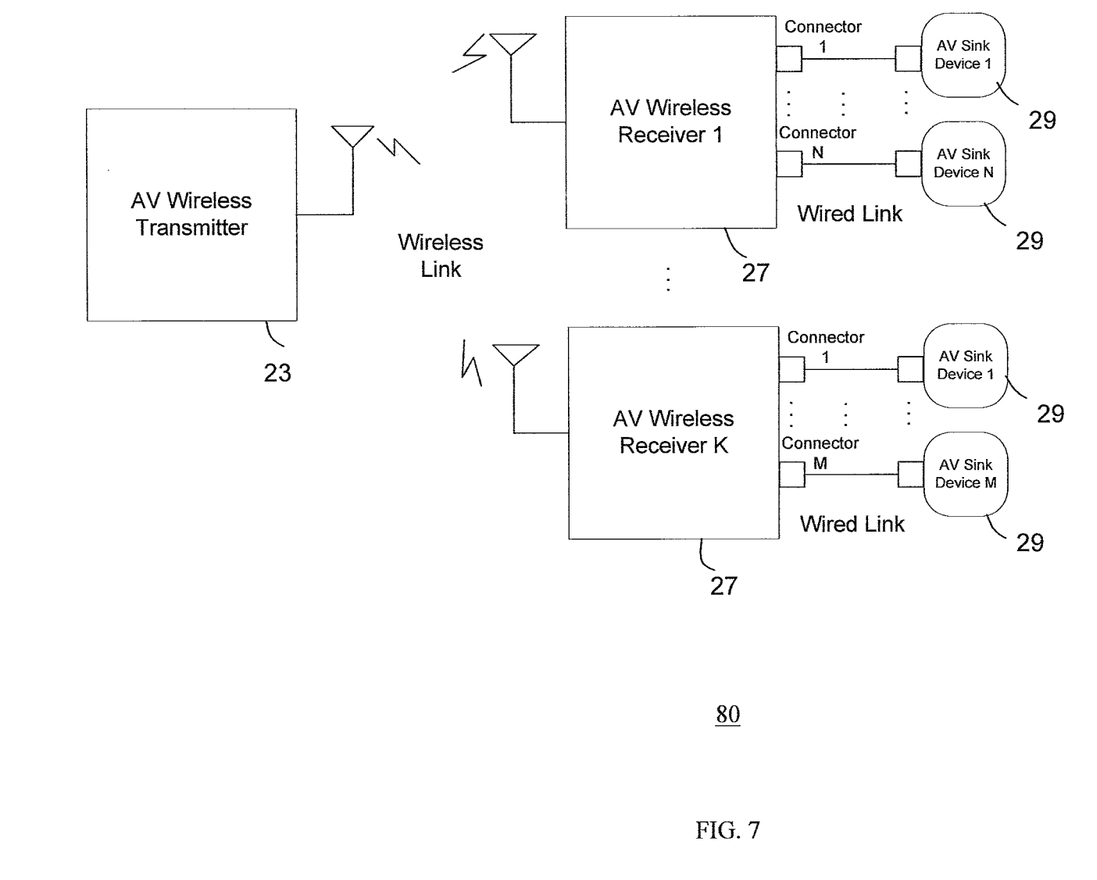
FIG. 7 shows architecture of another wireless communication system implementing AV connection maintenance, according to an embodiment of the invention.

Referring to FIG. 7, in another embodiment of the invention a communication system 80 includes an AV wireless transmitter 23 and multiple AV wireless receivers 27 in a network, each of which is connected to one or multiple wired-sink devices 29. An AV connection maintenance request control packet is multicast/broadcast to the AV wireless receivers 27 by the AV wireless transmitter 23 via truly omni-directional transmission or multiple point-to-point transmissions.

AV connection maintenance request/notification control packets are transmitted back to the transmitter 23 from the receivers 27 based on a channel access control mechanism at each receiver MAC layer such as Time Division Multiple Access (TDMA) or Carrier Sense Multiple Access (CSMA).

In another embodiment (not shown) the AV sink devices are connected to the receiver via wireless links. In another embodiment at least one AV sink device is connected to the receiver via a wired link, and at least one AV sink device is connected to the receiver via a wireless link.

Embodiments of the invention are useful with wireless networks such as wireless local area networks (e.g., 2.4 GHz and 5 GHz RF frequency band), and/or wireless networks operating over the mmWave frequency band such as specified in the Wireless Gigabit Alliance (WiGig specification) industry standard.

As is known to those skilled in the art, the aforementioned example architectures described above, according to the herein disclosed AV maintenance system and process, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the AV maintenance system and process can take the form of an entirely hardware embodiment, an entirely software embodiment or an embodiment containing both hardware and software elements.

Figure 8:
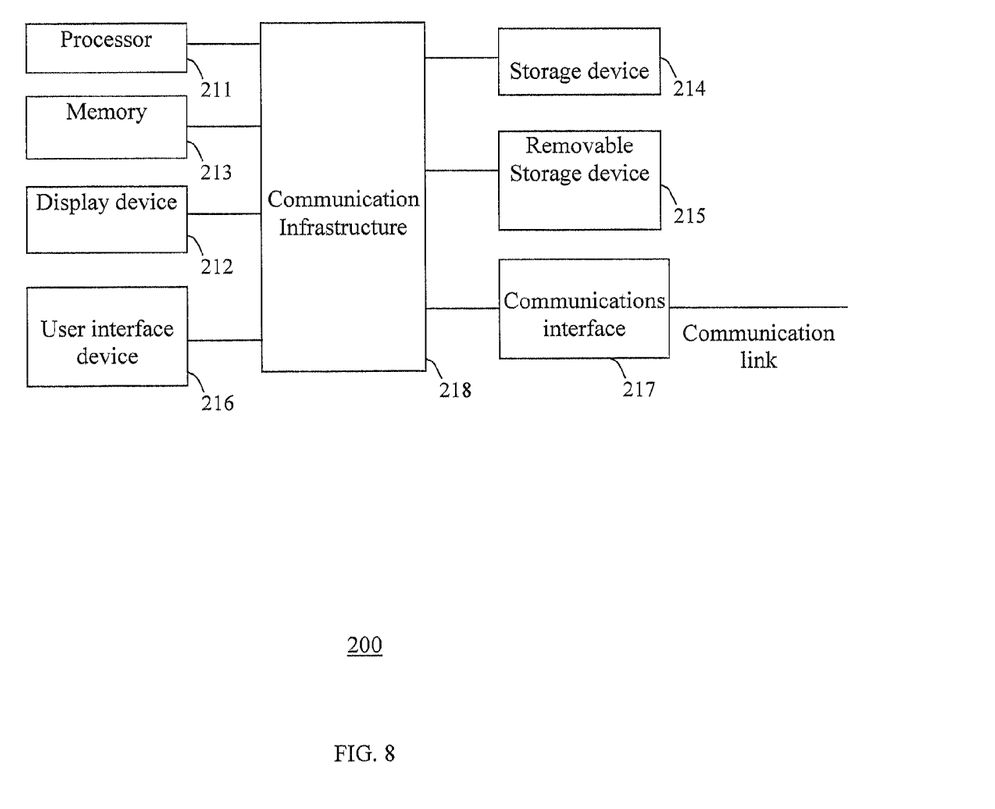
FIG. 8 is a high level block diagram showing an information processing system comprising a computer system useful for implementing an embodiment of the invention.

FIG. 8 is a high level block diagram showing an information processing system comprising a computer system 200 useful for implementing an embodiment of the present invention. The computer system 200 includes one or more processors 211, and can further include an electronic display device 212 (for displaying graphics, text, and other data), a main memory 213 (e.g., random access memory (RAM)), storage device 214 (e.g., hard disk drive), removable storage device 215 (e.g., removable storage drive, removable memory module, a magnetic tape drive, optical disk drive, computer readable medium having stored therein computer software and/or data), user interface device 216 (e.g., keyboard, touch screen, keypad, pointing device), and a communication interface 217 (e.g., modem, a network interface (such as an Ethernet card), a communications port, or a PCMCIA slot and card). The communication interface 217 allows software and data to be transferred between the computer system and external devices. The system 200 further includes a communications infrastructure 218 (e.g., a communications bus, cross-over bar, or network) to which the aforementioned devices/modules 211 through 217 are connected.

Information transferred via communications interface 217 may be in the form of signals such as electronic, electromagnetic, optical, or other signals capable of being received by communications interface 217, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of connection maintenance for communication of audio/video (AV) information, comprising:

transmitting audio/video (AV) information as multiple spatial streams from a wireless transmitter to at least one wireless receiver over a wireless link, wherein each spatial stream is targeted to one of multiple AV devices connected to the wireless receiver, wherein the AV information comprises an indication for a request for AV connection information for maintaining the wireless link between the wireless transmitter and the wireless receiver;

receiving the AV information at the wireless receiver and providing the AV information from each spatial stream to a target AV device connected to the wireless receiver via a communication link, wherein each communication link corresponds to a spatial stream;

detecting connection status information for the wireless link and the communication links; and transmitting the connection status information from the wireless receiver to the wireless transmitter.

2. The method of claim 1, further comprising:
periodically detecting connection status information for the wireless link and one or more of the communication links, and transmitting the connection status information from the wireless receiver to the wireless transmitter.

3. The method of claim 1, further comprising:
transmitting the indication for the request for AV connection information that comprises a connection status request, from the wireless transmitter to the wireless receiver for a spatial stream; and in response to the connection status request, detecting connection status information for the wireless link and the communication link corresponding to said spatial stream, and transmitting the connection status information from the wireless receiver to the wireless transmitter.

4. The method of claim 3, wherein:
said connection status request comprises a connection status request control packet; and
said connection status information is transmitted from the wireless receiver to the wireless transmitter in a connection status response control packet.

5. The method of claim 3, wherein:
transmitting the connection status request comprises placing the connection status request in the AV information payload for a spatial stream; and
said connection status information is transmitted from the wireless receiver to the wireless transmitter in a connection status response control packet.

6. The method of claim 3, wherein said connection status response control packet further includes:
stream identification for each spatial stream, wherein the stream identification for each spatial stream is associated with connection status information of a corresponding communication link that connects a target AV device of the spatial stream to the wireless receiver.

7. The method of claim 6, wherein said connection status response control packet further includes a transaction identification for identifying a specific transaction of connection maintenance.

8. The method of claim 7, wherein said connection status response control packet further includes the number of included streams.

9. The method of claim 1, further comprising:
detecting functional status of one or more of the AV devices connected to the wireless receiver, and transmitting said functional status to the wireless transmitter.

10. The method of claim 1, wherein one or more of said communication links comprise wired links.

11. The method of claim 1, wherein one or more of said communication links comprise wireless links.

12. The method of claim 1, wherein the wireless transmitter and wireless receiver operate in a wireless network.

13. The method of claim 1, further comprising:
transmitting audio/video (AV) information as spatial streams from a wireless transmitter to a plurality of wireless receivers over a wireless link, wherein each spatial stream is targeted to one of multiple AV devices connected to a wireless receiver;
receiving the AV information at a wireless receiver and providing the AV information from each spatial stream to a target AV device connected to the wireless receiver via a communication link, wherein each communication link corresponds to a spatial stream;
at each wireless receiver detecting connection status information for the wireless link and the communication links, and transmitting the connection status information from the wireless receiver to the wireless transmitter.

14. A wireless communication system for communication of audio/video (AV) information, comprising:
a wireless transmitter;
at least one wireless receiver; and
the wireless transmitter configured to transmit audio/video (AV) information as multiple spatial streams to each wireless receiver over a wireless link, wherein each spatial stream is targeted to one of multiple AV devices connected to the wireless receiver, wherein the AV information comprises an indication for a request for AV connection information for maintaining the wireless link between the wireless transmitter and the wireless receiver;
each wireless receiver configured to receive the AV information and provide the AV information from each spatial stream to a target AV device connected to the wireless receiver via a communication link, wherein each communication link corresponds to a spatial stream; and
a connection maintenance module that detects connection status information for the wireless link and the communication links, and transmits the connection status information from a wireless receiver to the wireless transmitter.

15. The system of claim 14, wherein:
the connection maintenance module is a component of a Protocol Adaptation Layer (PAL) layer of the wireless transmitter.

16. The system of claim 15, wherein:
the connection maintenance module is further a component of a Protocol Adaptation Layer (PAL) layer of each wireless receiver.

17. The system of claim 14, wherein:
the connection maintenance module periodically detects connection status information for the wireless link and one or more of the communication links, and transmits the connection status information from each wireless receiver to the wireless transmitter.

18. The system of claim 16, wherein:
the connection maintenance module transmits the indication for the request for AV connection information that comprises a connection status request, from the wireless transmitter to each wireless receiver for a corresponding spatial stream, wherein in response to the connection status request, the connection maintenance module for each wireless receiver detects connection status information for the wireless link and the communication link corresponding to said spatial stream, and transmits the connection status information to the wireless transmitter.

19. The system of claim 18, wherein:
said connection status request comprises a connection status request control packet; and
said connection status information is transmitted from each wireless receiver to the wireless transmitter in a connection status response control packet.

20. The system of claim 18, wherein:
the connection maintenance module transmits the connection status request comprises by placing the connection status request in the AV information payload for a spatial stream; and said connection status information is transmitted from each wireless receiver to the wireless transmitter in a connection status response control packet.

21. The system of claim 18, wherein said connection status response control packet further includes:
stream identification for each spatial stream, wherein the stream identification for each spatial stream is associated with connection status information of a corresponding communication link that connects a target AV device of the spatial stream to a wireless receiver.

22. The system of claim 21, wherein said connection status response control packet further includes a transaction identification for identifying a specific transaction of connection maintenance.

23. The system of claim 22, wherein said connection status response control packet further includes the number of included streams.

24. The system of claim 14, wherein:
the connection status module detects functional status of one or more of the AV devices connected to each wireless receiver, and transmits said functional status to the wireless transmitter.

25. The system of claim 14, wherein one or more of said communication links comprise wired links.

26. The system of claim 14, wherein one or more of said communication links comprise wireless links.

27. The system of claim 14, wherein the wireless transmitter and wireless receivers operate in a wireless local area network.

28. A monitoring device for a wireless local area network, comprising:
a connection maintenance module for monitoring connection status between a wireless transmitter and multiple wireless receivers;
wherein the wireless transmitter is configured to transmit audio/video (AV) information as multiple spatial streams to each wireless receiver over a wireless link, wherein each spatial stream is targeted to one of multiple AV devices connected to the wireless receiver, wherein the AV information comprises an indication for a request for AV connection information for maintaining the wireless link between the wireless transmitter and the wireless receiver;
wherein each wireless receiver configured to receive the AV information and provide the AV information from each spatial stream to a target AV device connected to the wireless receiver via a communication link, wherein each communication link corresponds to a spatial stream; and
wherein the connection maintenance module detects connection status information for the wireless link and the communication links, and transmits the connection status information from a wireless receiver to the wireless transmitter.

29. The device of claim 28, wherein:
the connection maintenance module is a component of a Protocol Adaptation Layer (PAL) layer in the wireless network.

30. The device of claim 28, wherein:
the connection maintenance module periodically detects connection status information for the wireless link and one or more of the communication links, and transmits the connection status information from each wireless receiver to the wireless transmitter.

31. The device of claim 30, wherein:
the connection maintenance module transmits the indication for the request for AV connection information that comprises a connection status request, from the wireless transmitter to each wireless receiver for a corresponding spatial stream, wherein in response to the connection status request, the connection maintenance module for each wireless receiver detects connection status information for the wireless link and the communication link corresponding to said spatial stream, and transmits the connection status information to the wireless transmitter.

32. The device of claim 31, wherein:
said connection status request comprises a connection status request control packet; and
said connection status information is transmitted from each wireless receiver to the wireless transmitter in a connection status response control packet.

33. The device of claim 31, wherein:
the connection maintenance module transmits a connection status request comprises by placing the connection status request in the AV information payload for a spatial stream; and
said connection status information is transmitted from each wireless receiver to the wireless transmitter in a connection status response control packet.

34. The device of claim 31, wherein said connection status response control packet further includes:
stream identification for each spatial stream, wherein the stream identification for each spatial stream is associated with connection status information of a corresponding communication link that connects a target AV device of the spatial stream to a wireless receiver.

35. The device of claim 34, wherein said connection status response control packet further includes a transaction identification for identifying a specific transaction of connection maintenance.

36. The device of claim 35, wherein said connection status response control packet further includes the number of included streams.

37. The device of claim 28, wherein:
the connection status module detects functional status of one or more of the AV devices connected to each wireless receiver, and transmits said functional status to the wireless transmitter.

38. The device of claim 28, wherein the wireless transmitter and wireless receivers operate in a wireless local area network.

39. The method of claim 1, wherein the indication for the request for AV connection information comprises an indication for an AV connection maintenance request for maintaining the wireless link that is established between the wireless transmitter and the wireless receiver.

40. The method of claim 39, wherein the indication for the AV connection maintenance request is transmitted in a field in an AV information payload for a spatial stream from the wireless transmitter to the wireless receiver.

* * * * *